United States Patent
Yamazaki et al.

(10) Patent No.: US 9,494,833 B2
(45) Date of Patent: Nov. 15, 2016

(54) DISPLAY DEVICE

(75) Inventors: Shunpei Yamazaki, Tokyo (JP); Jun Koyama, Kanagawa (JP); Hiroyuki Miyake, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 501 days.

(21) Appl. No.: 13/529,129

(22) Filed: Jun. 21, 2012

(65) Prior Publication Data

US 2012/0326951 A1 Dec. 27, 2012

(30) Foreign Application Priority Data

Jun. 24, 2011 (JP) .................................. 2011-140298

(51) Int. Cl.
*G02F 1/1345* (2006.01)

(52) U.S. Cl.
CPC .................................. *G02F 1/1345* (2013.01)

(58) Field of Classification Search
CPC ........... G02F 1/1343; G02F 1/136286; G02F 1/1345; G02F 2001/134318; G02F 1/13458; G02F 1/136204; G02F 2001/133388; G02F 1/13452; G09G 2300/0426; G09G 2300/0876; G09G 2320/0219; G09G 2320/0653; G09G 2330/04; G09G 3/3648; G09G 3/3674; G09G 2320/0209; H01L 27/3276
USPC .......................................... 349/40, 139, 149
See application file for complete search history.

(56) References Cited

U.S. PATENT DOCUMENTS

| | | | |
|---|---|---|---|
| 6,157,066 A * | 12/2000 | Kobayashi | 257/363 |
| 6,825,820 B2 | 11/2004 | Yamazaki et al. | |
| 6,891,523 B2 * | 5/2005 | Ozawa | 345/87 |
| 7,399,991 B2 | 7/2008 | Seo et al. | |
| 7,576,485 B2 | 8/2009 | Ohtani | |
| 7,679,284 B2 | 3/2010 | Kubota | |
| 7,710,739 B2 | 5/2010 | Kimura et al. | |
| 7,768,585 B2 | 8/2010 | Nakamura | |
| 8,259,463 B2 | 9/2012 | Kimura et al. | |
| 8,462,308 B2 | 6/2013 | Tanahara | |
| 8,760,378 B2 * | 6/2014 | Lee | 345/87 |
| 2002/0024493 A1 * | 2/2002 | Ozawa et al. | 345/92 |
| 2004/0012058 A1 * | 1/2004 | Aoki | 257/414 |
| 2005/0156840 A1 * | 7/2005 | Kim et al. | 345/87 |
| 2007/0096135 A1 | 5/2007 | Matsumoto | |
| 2007/0273802 A1 * | 11/2007 | Nakamura | 349/40 |
| 2010/0163284 A1 * | 7/2010 | Tanahara | 174/255 |
| 2013/0027282 A1 | 1/2013 | Kimura et al. | |

FOREIGN PATENT DOCUMENTS

| | | | |
|---|---|---|---|
| JP | 2002-324673 | | 11/2002 |
| JP | 2006-330711 | A | 12/2006 |
| JP | 2007-128049 | A | 5/2007 |
| JP | 2007-316104 | A | 12/2007 |
| JP | 2008-046278 | A | 2/2008 |
| JP | 2008-218395 | A | 9/2008 |
| JP | 2010-152091 | A | 7/2010 |

* cited by examiner

*Primary Examiner* — Hoan C Nguyen
(74) *Attorney, Agent, or Firm* — Husch Blackwell LLP

(57) ABSTRACT

To provide a display device with little signal delay and a display device that can operate with low power consumption, parasitic capacitance between a common wiring that applies a common potential to a plurality of pixels and signal lines that input signals for driving the pixels is avoided. Specifically, the common wiring is routed outwardly with respect to an external input terminal to which a signal is input from the, outside, to avoid intersections of the signal lines and the common wiring. Thus, parasitic capacitance between the common wiring and the signal lines is avoided, so that the display device can operate at high speed with low power consumption.

18 Claims, 8 Drawing Sheets

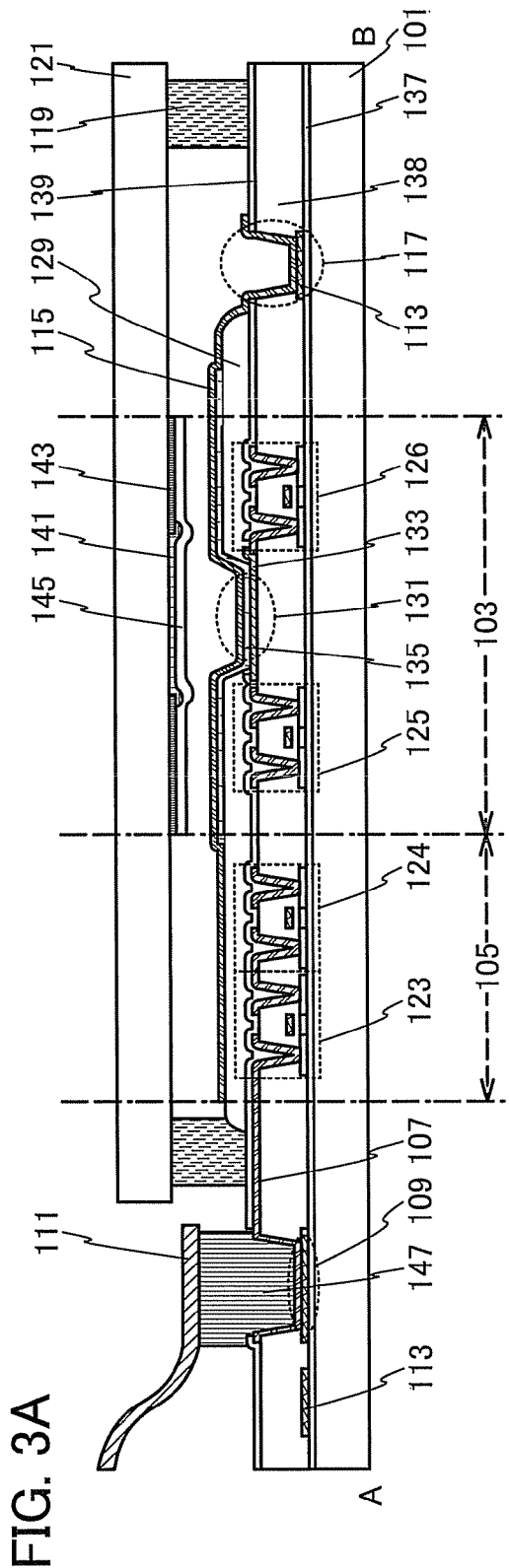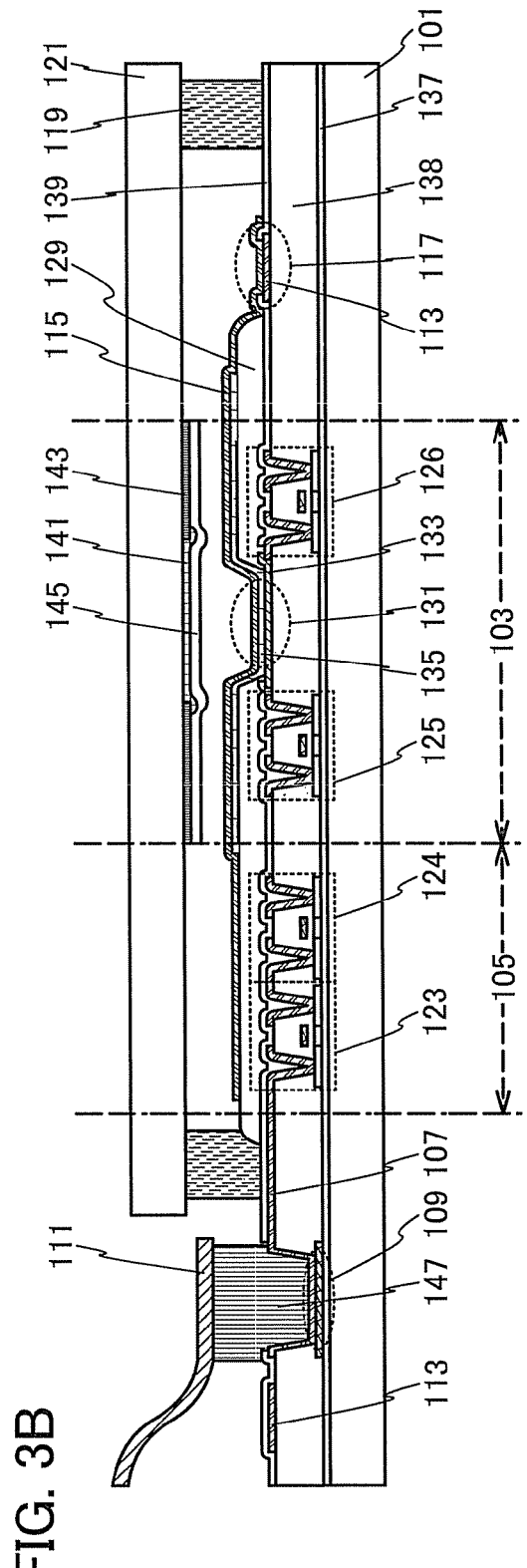

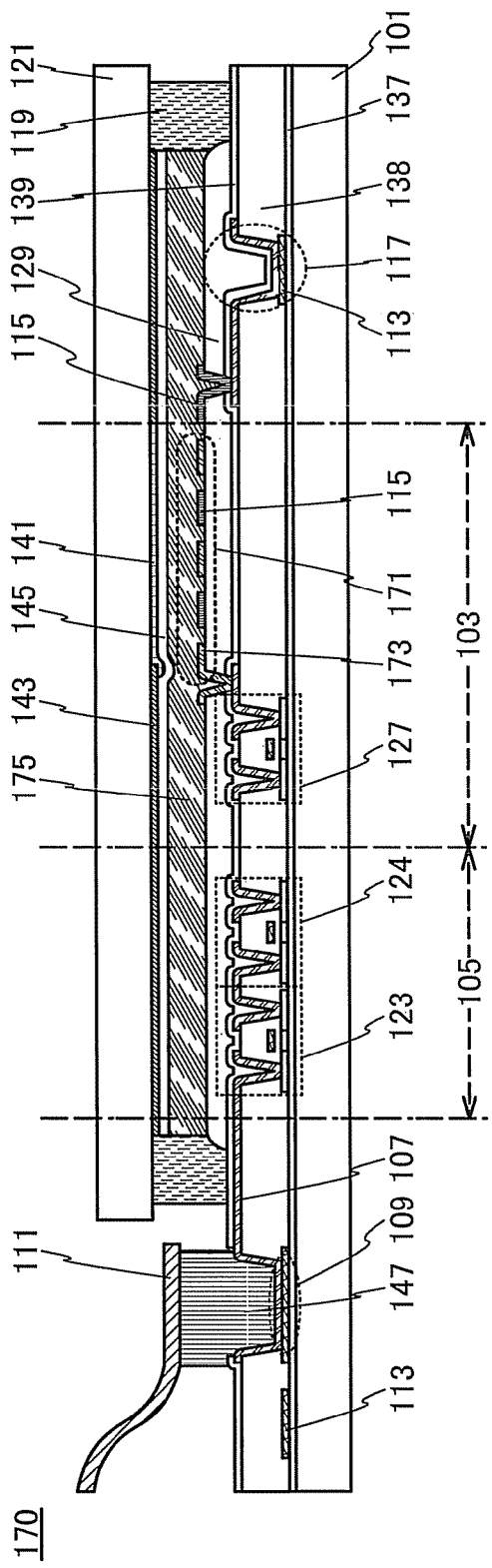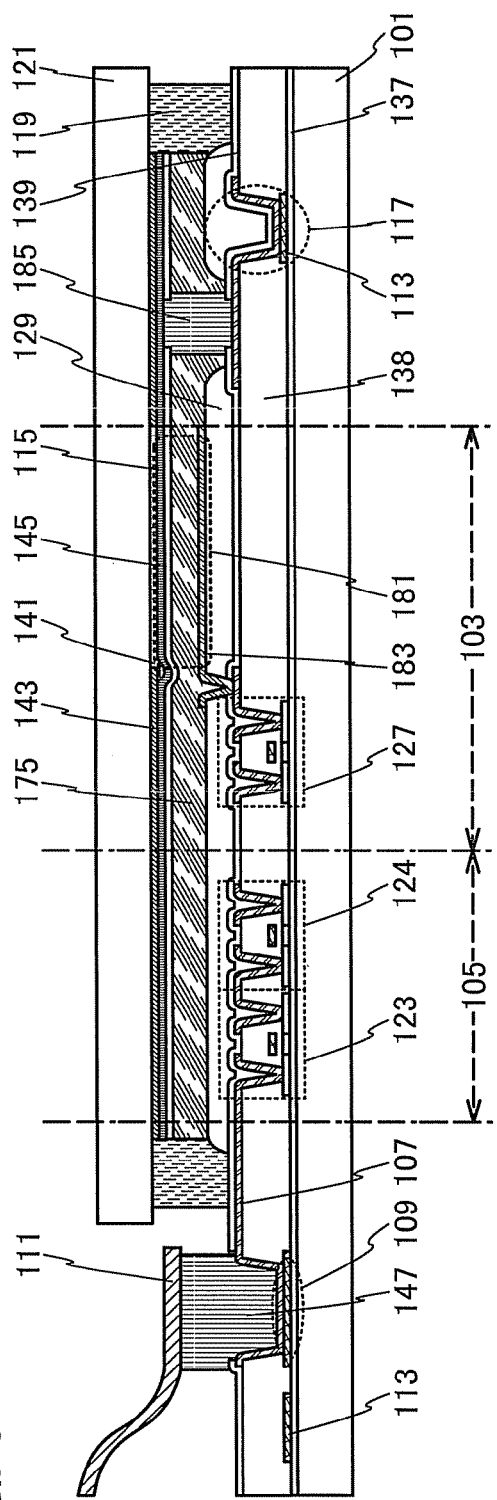

DISPLAY DEVICE

BACKGROUND OF THE INVENTION

1. Field of the Invention

The present invention relates to a display device including a display element having a pair of electrodes.

2. Description of the Related Art

There is known a display device that has a pair of electrodes and displays images by application of voltage between the electrodes.

In a liquid crystal display device, a liquid crystal is sandwiched between a pair of electrodes in a pixel, light from a backlight provided on a rear side transmits the liquid crystal, and the amount of transmitted light is controlled by the liquid crystal that polarizes light, whereby an image is displayed. There are a passive-matrix liquid crystal display device and an active-matrix liquid crystal display device including thin film transistors (TFTs).

In addition, organic EL (electroluminescent) elements have been actively researched and developed. In the fundamental structure of an organic EL element, a layer containing a light-emitting organic compound is sandwiched between a pair of electrodes. By voltage application to this element, the light-emitting organic compound can emit light.

Like a liquid crystal display device, a display device including an organic EL element has a passive-matrix structure, an active-matrix structure, or the like. An organic EL element is a self-light-emitting element that can be formed in a film shape, and does not need a backlight, which is required in a liquid crystal display device; therefore, a thin and lightweight display device with high contrast can be achieved. For example, Patent Document 1 discloses an example of a display device including an organic EL element.

[Reference]

Patent Document 1: Japanese Published Patent Application No. 2002-324673

SUMMARY OF THE INVENTION

In recent years, larger and higher-definition display devices have been required. For example, ultra high-definition display devices with a large number of pixels, such as a full high definition (FHD) display, a 4k2k display, and a 8k4k display, have been developed. When the size and definition of display devices are increased, the number of signal lines for inputting signals to pixels is increased with the increase in the number of pixels.

Moreover, high-speed operation of display devices is also required. Smoother moving images can be displayed, for example, with high-speed display using a drive frequency twice or four times as high as a conventional drive frequency.

However, the influence of parasitic capacitance between wirings becomes hard to ignore as the number of signal lines and the driving speed are increased. Specifically, when parasitic capacitance is generated between wirings, signal waveforms are distorted or signals are delayed, and high-speed driving is prevented. Further, the influence of charging and discharging of parasitic capacitance increases power consumption of a display device.

The present invention is made in view of the foregoing technical background. An object of one embodiment of the present invention is therefore to provide a display device with little signal delay. Another object is to provide a display device that can operate with low power consumption.

One embodiment of the present invention achieves at least one of the above objects.

To achieve the above objects, the present invention focuses on parasitic capacitance between a common wiring electrically connected to a common electrode (to which a common potential is applied) of a display element having a pair of electrodes (e.g., an organic EL element or a liquid crystal element), and signal lines inputting signals for driving pixels. The common wiring is routed outwardly with respect to an external input terminal to which a signal is input externally, to avoid intersections of the signal lines and the common wiring.

An external input terminal is a terminal to which a circuit element such as a flexible printed circuit (FPC), a printed wiring board, or an IC is electrically connected, and is formed such that part of a conductive layer included therein is exposed. The external input terminal is supplied with an image signal, a power supply potential, a common potential, and the like from the outside through an FPC or the like. Signal lines are provided between the external input terminal and pixels. Note that a driver circuit (e.g., a source line driver circuit or a gate line driver circuit) may be provided between the external input terminal and the pixels.

A common wiring is a wiring electrically connected to a common electrode of a display element. For example, the common wiring is supplied with a positive potential when the common electrode is used as an anode, and is supplied with a potential lower than a potential applied to the anode, such as a reference potential, a negative potential, a ground potential, or 0 V when the common electrode is used as a cathode.

Specifically, a display device according to one embodiment of the present invention includes a display portion including a plurality of pixels, an external input terminal to which a signal is input from the outside, a signal line that electrically connects the external input terminal and the display portion, and a common wiring that applies a common potential to the display portion. The external input terminal is provided between the common wiring and the display portion, and the common wiring is provided so as not to overlap with the signal line.

In the above manner, the common wiring to which the common potential is applied is provided outwardly with respect to the external input terminal of the display device so as not to intersect with the signal line, whereby parasitic capacitance between the common wiring and the signal line is avoided. Therefore, delay and waveform distortion of signals due to the parasitic capacitance are suppressed, and the display device can operate at high speed. Further, since the parasitic capacitance in the display device is low, power consumption due to charging and discharging of the parasitic capacitance is reduced, and as a result, the display device can operate with low power consumption.

According to another embodiment of the present invention, in the above display device, the common wiring is arranged to form a closed curve surrounding the display portion and the external input terminal.

When the common wiring is arranged in a closed curve surrounding the display portion, the following effects are obtained: electrical noise input to the display device from the outside is reduced and the display quality is increased accordingly, and electrostatic discharge (ESD) of elements such as a transistor and a light-emitting element included in the display portion can be prevented from being caused by high voltage due to static electricity generated when the display device is being fabricated or is used.

According to another embodiment of the present invention, in any of the above display devices, the pixel includes at least one transistor and a pixel electrode electrically connected to the transistor, and the common wiring is formed from the same conductive film as source and/or drain electrodes or a gate electrode in the transistor or the pixel electrode.

According to another embodiment of the present invention, in any of the above display devices, the common wiring includes a conductive layer which is formed from the same conductive film as the signal line.

When the common wiring is formed using the same conductive film as the wiring, the electrode, or the like included in the pixel as described above, the common wiring can be easily formed without the increase in the number of fabrication steps. Similarly, the common wiring can be formed using the same conductive film as the signal line. A wiring routed over a relatively long distance, such as the signal line and the common wiring, is preferably formed using a relatively thick conductive film in order to reduce wiring resistance. When such wirings are formed using the same conductive film, the fabrication time can be shortened.

According to another embodiment of the present invention, in any of the above display devices, the pixel includes a light-emitting element in which a pixel electrode, a layer containing at least a light-emitting organic compound, and a common electrode are stacked.

According to another embodiment of the present invention, in any of the above display devices, the pixel includes a liquid crystal element in which a liquid crystal is sandwiched between a pixel electrode and a common electrode.

As described above, a light-emitting element such as an organic EL element or a liquid crystal element can be applied to the display device according to one embodiment of the present invention, and the display device can operate at high speed with low power consumption.

Note that in this specification and the like, a display element includes, in its category, a light-emitting element such as an EL element that includes a light-emitting compound between a pair of electrodes and emits light by voltage application; and an optical element such as a liquid crystal element that includes a liquid crystal between a pair of electrodes and controls polarization of transmitted light by change of liquid crystal alignment with voltage application. EL elements are classified into two categories: an organic EL element including a light-emitting organic compound, and an inorganic EL element including a light-emitting inorganic compound.

In this specification and the like, a closed curve is a continuous curve having no end points. The term "curve" here includes the concept of straight line and line segment in a broad sense. For example, an outline of a quadrilateral, which has a plurality of line segments each having the end points coinciding with one end point of other line segments, is therefore one mode of a closed curve. Moreover, the following is one mode of a closed curve: a polygon, a circle, an ellipse, a shape with a plurality of curves with different curvatures, and a shape with a combination of straight lines and curves.

In this specification, a display device includes any of the following modules in its category: a module to which a connector such as an FPC, tape automated bonding (TAB) tape, or a tape carrier package (TCP) is attached; a module having TAB tape or a TCP that is provided with a printed wiring board at the end thereof; and a module having an integrated circuit (IC) that is directly mounted by chip on glass (COG) on a substrate where display elements are formed.

According to the present invention, a display device with little signal delay can be provided. Moreover, a display device that can operate with low power consumption can be provided.

BRIEF DESCRIPTION OF THE DRAWINGS

In the accompanying drawings:

FIGS. 3A and 3B each illustrate a display device according to one embodiment of the present invention;

FIGS. 5A and 5B each illustrate a display device according to one embodiment of the present invention;

DETAILED DESCRIPTION OF THE INVENTION

Figure 1:
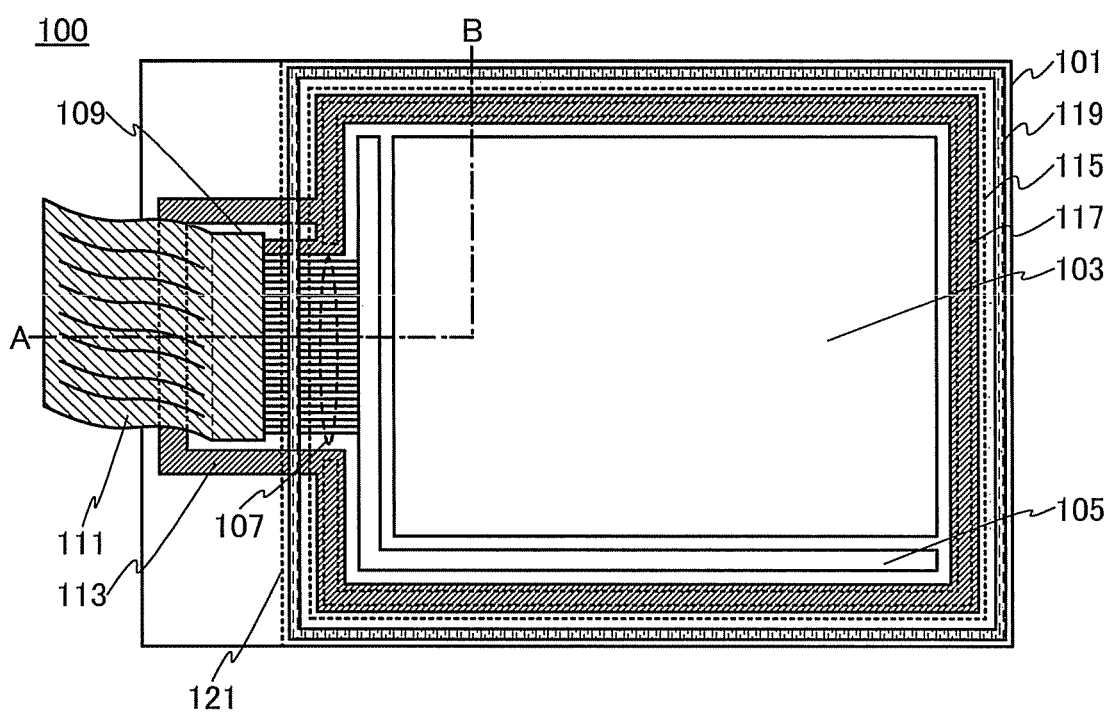
FIG. 1 illustrates a display device according to one embodiment of the present invention.

Embodiments will be described in detail with reference to the accompanying drawings. Note that the present invention is not limited to the following description, and it will be easily understood by those skilled in the art that modes and details can be variously changed unless departing from the spirit and scope of the present invention. Therefore, the present invention should not be limited to the descriptions of the embodiments below. Note that in structures of the present invention described hereinafter, the same portions or portions having similar functions are denoted by the same reference numerals in different drawings, and description thereof is not repeated.

Note that in each drawing described in this specification, the size, the layer thickness, or the region of each component is exaggerated for clarity in some cases. Therefore, embodiments of the present invention are not limited to such scales.

A transistor is one of semiconductor elements and can amplify current or voltage and perform switching operation for controlling conduction and non-conduction, for example. A transistor in this specification includes an insulated-gate field effect transistor (IGFET) and a thin film transistor (TFT) in its category.

Functions of a "source" and a "drain" are sometimes replaced with each other when a transistor of opposite polarity is used or when the direction of current flowing is changed in circuit operation, for example. Therefore, the terms "source" and "drain" can be replaced with each other in this specification.

In this specification and the like, one of a source and a drain of a transistor is called a "first electrode" and the other of the source and the drain is called a "second electrode" in some cases. In that case, a gate is referred to as a "gate" or a "gate electrode".

In this specification and the like, the term "electrically connected" includes the case where components are connected through an object having any electric function. There is no particular limitation on an object having any electric function as long as electric signals can be transmitted and received between components that are connected through the object. Examples of an object having any electric function are a switching element such as a transistor, a resistor, an inductor, a capacitor, and an element with a variety of functions as well as an electrode and a wiring.

(Embodiment 1)

In this embodiment, structures of active-matrix display devices according to one embodiment of the present invention, to which an organic EL element is applied, will be described with reference to FIG. 1, FIGS. 2A and 2B, FIGS. 3A and 3B, and FIGS. 4A and 4B.

<Example of Top View Showing Structure of Display Device>

FIG. 1 is a schematic top view of a display device 100 exemplified in this embodiment. Note that in FIG. 1, some components (e.g., a second substrate 121 and a common electrode 115) of the display device 100 are shown only in dashed outline for easy understanding.

The display device 100 includes a display portion 103 and a driver circuit unit 105 that are sandwiched between a first substrate 101 and the second substrate 121. Signal lines 107, an external input terminal 109, a common wiring 113, and the like as well as the display portion 103 and the driver circuit unit 105 are formed over the first substrate 101.

The first substrate 101 and the second substrate 121 are bonded to each other at an outer edge portion of the second substrate 121 by using a sealant 119, thereby forming a sealed region which is an enclosed space surrounded by the first substrate 101, the second substrate 121, and the sealant 119. In the sealed region, part of the signal lines 107, part of the common wiring 113, the display portion 103, and the driver circuit unit 105 are formed.

The display portion 103 includes a plurality of pixels arranged in a matrix. Each of the pixels is electrically connected to the driver circuit unit 105, and the operation of the pixels is controlled by the driver circuit unit 105.

The external input terminal 109 is provided outside the sealed region over the first substrate 101. An FPC 111 is bonded to the external input terminal 109 so that they are electrically connected to each other. Moreover, the external input terminal 109 and the driver circuit unit 105 are electrically connected through the signal lines 107, and signals (e.g., a video signal, a clock signal, a start signal, and a reset signal), a power supply potential, a reference potential, and the like are input from the FPC 111 to the driver circuit unit 105 through the signal lines 107.

The common wiring 113 that supplies a common potential to the common electrode 115 of an organic EL element in the pixel is formed over the first substrate 101. The common electrode 115 is formed in a region overlapping with the display portion 103, the driver circuit unit 105, and the common wiring 113, and is electrically connected to the common wiring 113 through an opening 117 formed over the common wiring 113.

The common wiring 113 is routed outwardly with respect to the signal lines 107 and the external input terminal 109 (placed on the side nearer to the outer edge of the first substrate 101) so as not to overlap with the signal lines 107. The common wiring 113 is electrically connected to the external input terminal 109 and supplied with the common potential from the FPC 111.

As described above, the common wiring 113 is formed to surround the signal lines 107 and the external input terminal 109 so as not to overlap with the signal lines 107, whereby parasitic capacitance is not generated between the signal lines 107 and the common wiring 113 and delay and waveform distortion of signals input to the driver circuit unit 105 can be suppressed; consequently, high-speed operation can be achieved.

Further, since no parasitic capacitance is generated, the influence of charging and discharging of parasitic capacitance is prevented, which results in suppression of the increase in power consumed to drive the display device 100.

The common wiring 113 is preferably formed into a closed curve that surrounds the signal lines 107, the driver circuit unit 105, and the display portion 103. The common wiring 113 formed in such a manner has the following effects: electrical noise input to the display device 100 from the outside is reduced and the display quality is increased accordingly, and electrostatic discharge of a transistor and a light-emitting element in the display device 100 is prevented from being caused by high voltage due to static electricity generated when the display device 100 is being fabricated or is used.

<Structural Example of Display Device Including Plural External Input Terminals>

The display device 100 exemplified above includes one external input terminal 109; alternatively, a display device can include two or more external input terminals. A display device including a plurality of external input terminals will be described below.

Figure 2A:
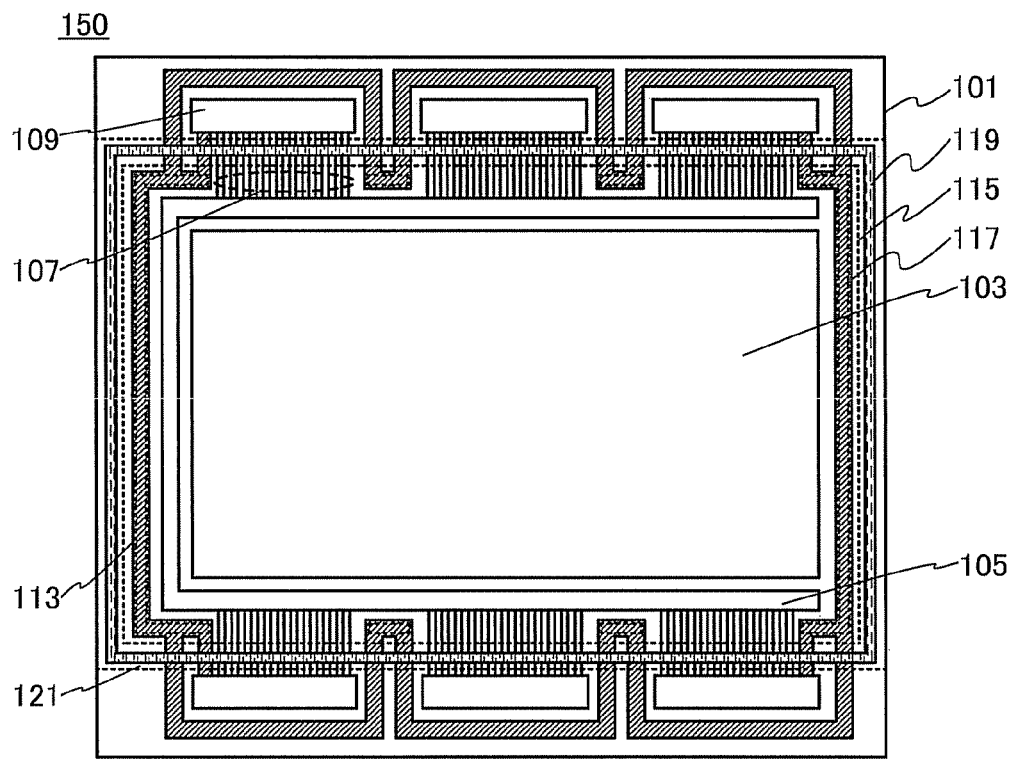
FIGS. 2A and 2B each illustrate a display device according to one embodiment of the present invention.

FIG. 2A is a schematic top view of a display device 150 including six external input terminals 109. Note that an FPC is not shown in FIG. 2A for easy understanding.

In the display device 150, the driver circuit unit 105 is provided along three sides of the display portion 103. Three external input terminals 109 and the other three external input terminals 109 are provided separately with the display portion 103 placed therebetween. Each of the external input terminals 109 is electrically connected to the driver circuit unit 105 through the signal lines 107.

The common wiring 113 is provided to surround the display portion 103, the driver circuit unit 105, and the external input terminals 109 and not to overlap with the signal lines 107. In a sealed region (a region overlapping with the second substrate 121), the opening 117 is provided over the common wiring 113 and the common wiring 113 is electrically connected to the common electrode 115.

The common wiring 113 is electrically connected to four external input terminals 109 provided at the four corners of the first substrate 101. Consequently, the common wiring 113 is supplied with the common potential from an FPC that is connected to these four external input terminals 109.

Figure 2B:
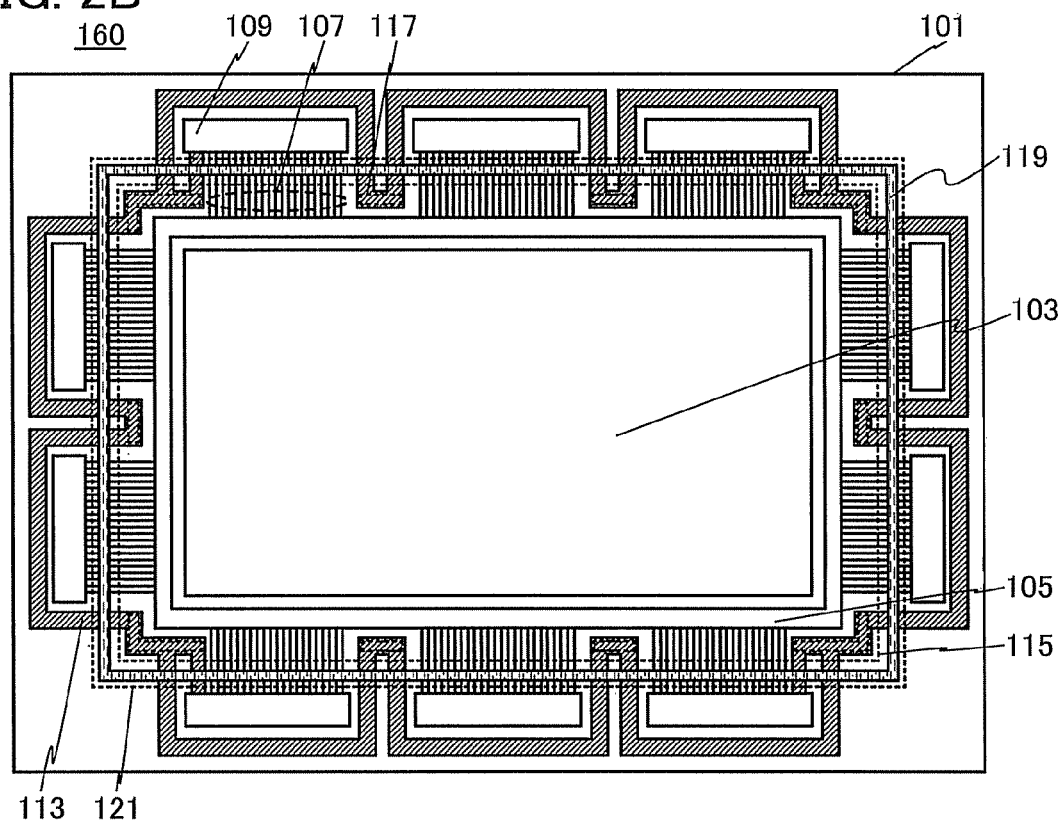

FIG. 2B is a schematic top view of a display device 160 including ten external input terminals 109. An FPC is not shown in FIG. 2B as in the above example.

In the display device 160, the driver circuit unit 105 is provided to surround the display portion 103. The total of ten external input terminals 109 are provided along two pairs of opposite sides of the display portion 103; three external input terminals 109 are provided along each of one pair of opposite sides, and two external input terminals 109 are provided along each of the other pair of opposite sides. Moreover, each of the external input terminals 109 is electrically connected to the driver circuit unit 105 through the signal lines 107.

The common wiring 113 is provided to surround the display portion 103, the driver circuit unit 105, and the external input terminals 109 and not to overlap with the signal lines 107. In a sealed region, the opening 117 is provided over the common wiring 113 and the common wiring 113 is electrically connected to the common electrode 115.

The common wiring 113 is electrically connected to four external input terminals 109 provided at the four corners of the first substrate 101. Consequently, the common wiring 113 is supplied with the common potential from an FPC that is connected to these four external input terminals 109.

Here, it is preferable to employ the structure in which the common wiring 113 is connected to at least two external input terminals 109, such as those of the display devices 150 and 160. This is because even if common potentials supplied from different external input terminals are slightly different from each other, such a structure can mitigate the influence of the variation in potentials supplied to the common electrode 115 from the external input terminals and variation in the potentials of the common electrode 115, and luminance unevenness of a display image can be suppressed as a result.

It is particularly preferable that the common wiring 113 be arranged to formula closed curve that surrounds the display portion 103 and the driver circuit unit 105, because electrical noise input to the display device from the outside is reduced and the display quality is Increased accordingly and because generation of electrostatic discharge can be prevented while the display device is being fabricated or is used.

<Example of Cross-Sectional Structure of Display Device>

Next, a cross-sectional structure of the display device 100 will be described with reference to FIG. 3A. FIG. 3A is a schematic cross-sectional view along line A-B of regions including the common wiring 113, the external input terminal 109, the signal line 107, the driver circuit unit 105, and the display portion 103 in FIG. 1.

As an example, the driver circuit unit 105 includes a CMOS circuit which is a combination of an n-channel transistor 123 and a p-channel transistor 124. Note that a circuit included in the driver circuit unit 105 can be constituted by various types of circuits such as a CMOS circuit, a PMOS circuit, or an NMOS circuit. This embodiment shows a driver-integrated structure in which a driver circuit and a display portion are formed over one substrate; however, the present invention is not limited to this structure, and it is possible that a driver circuit is not formed over a substrate where a display portion is formed and a driver circuit separately formed is mounted.

FIG. 3A illustrates a cross-sectional structure of one pixel as the display portion 103. One pixel includes a switching transistor 125, a current control transistor 126, and a pixel electrode 133 that is electrically connected to an electrode (a source electrode or a drain electrode) of the current control transistor 126. The display portion 103 is composed of a plurality of pixels. An insulating layer 129 is formed to cover an end portion of the pixel electrode 133.

Note that there is no particular limitation on the structures of the transistors such as a transistor included in the driver circuit unit 105, the switching transistor 125, and the current control transistor 126. For example, a forward staggered transistor or an inverted staggered transistor may be used. Furthermore, a top-gate transistor or a bottom-gate transistor may be used. There is no particular limitation also on materials of a semiconductor used for transistors, and silicon or an oxide semiconductor such as oxide containing at least one of indium, gallium, and zinc may be used. Further, there is no particular limitation on the crystallinity of a semiconductor used for transistors, and an amorphous semiconductor or a crystalline semiconductor may be used.

A light-emitting element 131 is composed of the pixel electrode 133, an EL layer 135, and the common electrode 115. The structure, materials, and the like of the light-emitting element will be described in detail in Embodiment 3.

Conductive layers are used as the pixel electrode 133 and the common electrode 115; a material that transmits light emitted from the EL layer 135 is used for an electrode through which light is emitted, and a material that reflects light emitted from the EL layer 135 is used for an electrode provided on the side opposite to the electrode through which light is emitted.

Examples of a light-transmitting material that can be used for the conductive layer through which light is emitted are indium oxide, indium tin oxide, indium zinc oxide, zinc oxide, zinc oxide to which gallium is added, and graphene. Other examples are a metal material such as gold, silver, platinum, magnesium, nickel, tungsten, chromium, molybdenum, iron, cobalt, copper, palladium, and titanium; an alloy material containing any of these metal materials; and nitride of any of these metal materials (e.g., titanium nitride). In the case of using the metal material or the alloy material (or the nitride of the metal material), the conductive layer needs to have a thickness small enough to transmit light. Alternatively, a stack of any of the above materials can be used as the conductive layer. For example, a stack of an alloy of silver and magnesium and indium tin oxide is preferably used because the conductivity can be increased.

Examples of a light-reflecting material that can be used for the conductive layer provided on the side opposite to the conductive layer through which light is emitted are a metal material such as aluminum, gold, platinum, silver, nickel, tungsten, chromium, molybdenum, iron, cobalt, copper, and palladium; an alloy material containing any of these metal materials; an alloy containing aluminum (aluminum alloy), such as an alloy of aluminum and titanium, an alloy of aluminum and nickel, and an alloy of aluminum and neodymium; and an alloy containing silver, such as an alloy of silver and copper and an alloy of silver and magnesium. An alloy of silver and copper is preferable because of its high heat resistance. Further, by stacking a metal film or a metal oxide film in contact with an aluminum alloy film, oxidation of the aluminum alloy film can be suppressed. Examples of a material for the metal film or the metal oxide film are titanium and titanium oxide. Alternatively, the conductive layer may be a stack of a film containing any of the above light-transmitting materials and a film containing any of the above metal materials. For example, the conductive layer can be a stack of silver and indium tin oxide or a stack of an alloy of silver and magnesium and indium tin oxide.

The insulating layer 129 is provided to cover the end portion of the pixel electrode 133. The insulating layer 129 is preferably formed so that its upper end portion or lower end portion has a curved surface with a curvature, in order to be adequately covered with the common electrode 115 which is formed over the insulating layer 129. For example, it is preferable that the upper end portion or the lower end portion of the insulating layer 129 have a curved surface with a radius of curvature of 0.2 μm to 3 μm. The insulating layer 129 can be formed using an organic compound such as a negative photosensitive resin or a positive photosensitive resin, or an inorganic compound such as silicon oxide or silicon oxynitride.

An insulating layer 137 is formed on a surface of the first substrate 101. The insulating layer 137 has an effect of preventing diffusion of impurities included in the first substrate 101. An insulating layer 139 is formed on and in contact with a source electrode and a drain electrode of each transistor. The insulating layer 139 has an effect of preventing diffusion of impurities into a semiconductor included in the transistors. For the insulating layers 137 and 139, an inorganic insulating film that prevents diffusion of impurities can be used, and for example, a film of semiconductor oxide or metal oxide (e.g., silicon oxide or aluminum oxide) can be used. Note that the insulating layers 137 and 139 are not necessarily provided when not needed.

On the second substrate 121, a color filter 141 is provided to overlap with the light-emitting element 131. The color filter 141 is provided in order to control the color of light emitted from the light-emitting element 131. For example, in a full-color display device using white light-emitting elements, a plurality of pixels provided with color filters of different colors are used. In that case, the color filters may have three colors of R (red), G (green), and B (blue) or four colors (yellow (Y) or white (W) in addition to RGB).

A black matrix 143 is provided between the adjacent color filters 141. The black matrix 143 shields a pixel from light emitted from the light-emitting elements 131 in adjacent pixels and prevents color mixture between the adjacent pixels. Here, the color filter 141 is provided so that its end portions overlap with the black matrix 143, whereby light leakage can be reduced. The black matrix 143 can be formed using a material that blocks light emitted from the light-emitting element 131, for example, a metal or an organic resin. Note that the black matrix 143 may be provided in a region other than the display portion 103, for example, in the driver circuit unit 105.

An overcoat 145 is formed to cover the color filter 141 and the black matrix 143. The overcoat 145 is formed using a material that transmits light emitted from the light-emitting element 131, and can be an inorganic insulating film or an organic insulating film, for example. Note that the overcoat 145 is not necessarily provided when not needed.

Although the cross-sectional view in FIG. 3A illustrates only one light-emitting element 131, a plurality of light-emitting elements are arranged in a matrix in the display portion 103. For example, a display device capable of full-color display can be provided by including light-emitting elements that emit light of three colors (R, G, and B) in the display portion 103. Moreover, a display device capable of full-color display can be provided by using a combination of color filters and a light-emitting element including an EL layer that emits white light, which is exemplified in Embodiment 3. The light-emitting element can have any of a top emission structure, a bottom emission structure, and a dual emission structure. When a color filter is used in a bottom emission structure, the color filter is provided on the side from which light is extracted (the color filter is positioned closer to the first substrate 101 than the pixel electrode 133 is).

The first substrate 101 and the second substrate 121 are bonded to each other at the outer edge portion of the second substrate 121 by using the sealant 119. Examples of the sealant 119 are organic resins such as thermosetting resin and photocurable resin and low-melting-point glass (also referred to as glass frit). A drying agent may be contained in the sealant 119. For example, a substance that absorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used as the drying agent. The sealant 119 preferably contains a drying agent because impurities such as moisture in the sealed region can be reduced and the reliability of the light-emitting element 131 can be increased.

The light-emitting element 131 is provided in the sealed region surrounded by the first substrate 101, the second substrate 121, and the sealant 119. The sealed region may be filled with an inert gas such as a rare gas or a nitrogen gas or a solid such as organic resin, or may be in a reduced pressure atmosphere. The amount of impurities such as water and oxygen in the sealed region is preferably small even if the sealed region is filled with a gas or a solid or is in a reduced pressure atmosphere, because the reliability of the light-emitting element is increased.

The signal line 107 connected to the driver circuit unit 105 is extended outside the sealed region and electrically connected to the external input terminal 109 provided outside the sealed region. Here, a gate electrode of each transistor is formed from a first conductive film, and the source and/or drain electrodes of each transistor and the signal line 107 are formed from a second conductive film. A conductive layer formed from the first conductive film is electrically connected to part of the signal line 107 through an opening provided in an insulating layer 138. The external input terminal 109 consists of an electrode in which the part of the signal line 107 and the conductive layer formed from the first conductive film are stacked.

A connector 147 is provided in contact with the external input terminal 109, and the FPC 111 and the external input terminal 109 are electrically connected to each other through the connector 147. The connector 147 can be formed using a paste-form or sheet-faun material that is obtained by mixing metal particles to a thermosetting resin and exhibits anisotropic conductivity by thermocompression bonding. As the metal particles, particles in which two or more kinds of metals are layered, for example, Ni particles coated with Au are preferably used.

In the sealed region, the common electrode 115 is electrically connected to the common wiring 113 through the opening 117 provided in the insulating layer 138. Here, the common wiring 113 is formed from the same first conductive film as the gate electrode of each transistor.

The common wiring 113 is provided so as not to overlap with the signal line 107. Moreover, the common wiring 113 outside the sealed region is routed outwardly with respect to the external input terminal 109 (placed nearer to the outer edge of the first substrate 101). Here, although a region where the FPC 111 and the common wiring 113 overlap with each other is formed, the distance between the FPC 111 and the common wiring 113 is sufficiently large and parasitic capacitance is not generated between the FPC 111 and the common wiring 113; consequently, delay and waveform distortion of signals input from the FPC 111 are prevented as much as, possible.

As described above, in the display device according to one embodiment of the present invention, the common wiring 113 is positioned to surround the signal lines 107 and the external input terminal 109 so as not to overlap with the signal lines 107 to which signals are input from the FPC 111. As a result, parasitic capacitance is not generated between the signal lines 107 and the common wiring 113, so that delay and waveform distortion of signals input to the driver circuit unit 105 can be suppressed; thus, the display device can operate at high speed. Further, since no parasitic capacitance is generated, the influence of charging and discharging of parasitic capacitance is prevented, which results in suppression of the increase in power consumed to drive the display device 100.

The common wiring 113 can be formed from the same conductive film as the conductive layer included in the transistor or the light-emitting element in the display device 100. Specifically, the common wiring 113 can be formed from the same first conductive film as the gate electrode of each transistor, the same second conductive film as the source electrode and/or the drain electrode, and/or the same third conductive film as the pixel electrode 133 of the light-emitting element 131. Thus, the common wiring 113 can be easily formed without the increase in the number of steps. The conductive film used for the common wiring 113 is preferably formed using a material with relatively low resistance, and for example, can be formed, as appropriate, using a material of the electrode provided on the side opposite to the electrode through which light is emitted.

FIG. 3A shows the structure in which the common wiring 113 is formed from the same first conductive film as the gate electrode of each transistor. Next, the case where the common wiring 113 is formed using a different conductive film will be described.

FIG. 3B is a schematic cross-sectional view of a display device in which the common wiring 113 is formed using the same second conductive film as the source and/or drain electrodes of each transistor.

In the sealed region, the common electrode 115 and the common wiring 113 are electrically connected to each other through the opening 117 formed in the insulating layer 139 over the common wiring 113. Outside the sealed region, the insulating layer 139 is formed over the common wiring 113 so that the common wiring 113 is not exposed.

Since the common wiring 113 is placed so as not to overlap with the signal line 107, the common wiring 113 can be formed from the same conductive film as the signal line 107 as illustrated in FIG. 3B. A wiring routed over a relatively long distance, such as the common wiring 113 and the signal line 107, is preferably formed from a relatively thick conductive film in order to reduce wiring resistance. When such wirings are formed from the same conductive film, the fabrication time can be shortened.

Figure 4A:
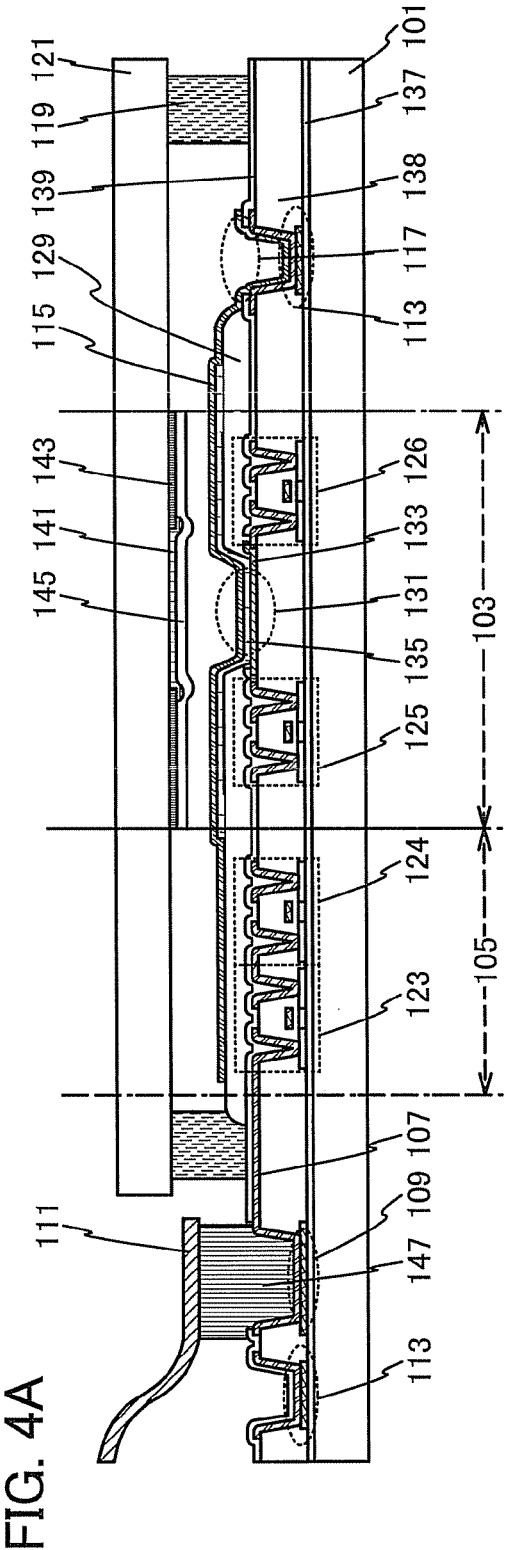
FIGS. 4A and 4B each illustrate a display device according to one embodiment of the present invention.

FIG. 4A is a schematic cross-sectional view of a display device where the common wiring 113 is formed from a stack of a conductive layer formed from the same first conductive film as the gate electrode of each transistor and a conductive layer formed from the same second conductive film as the source electrode and/or the drain electrode are stacked.

In the sealed region, the conductive layer formed from the first conductive film and the conductive layer fanned from the second conductive film that form the common wiring 113 are electrically connected to each other through an opening formed in the insulating layer 138. Further, the common electrode 115 and the common wiring 113 (specifically the conductive layer formed from the second conductive film included in the common wiring 113) are electrically connected to each other through the opening 117 formed in the insulating layer 139. Outside the sealed region, the insulating layer 139 is formed over the common wiring 113 so that the common wiring 113 is not exposed.

Figure 4B:
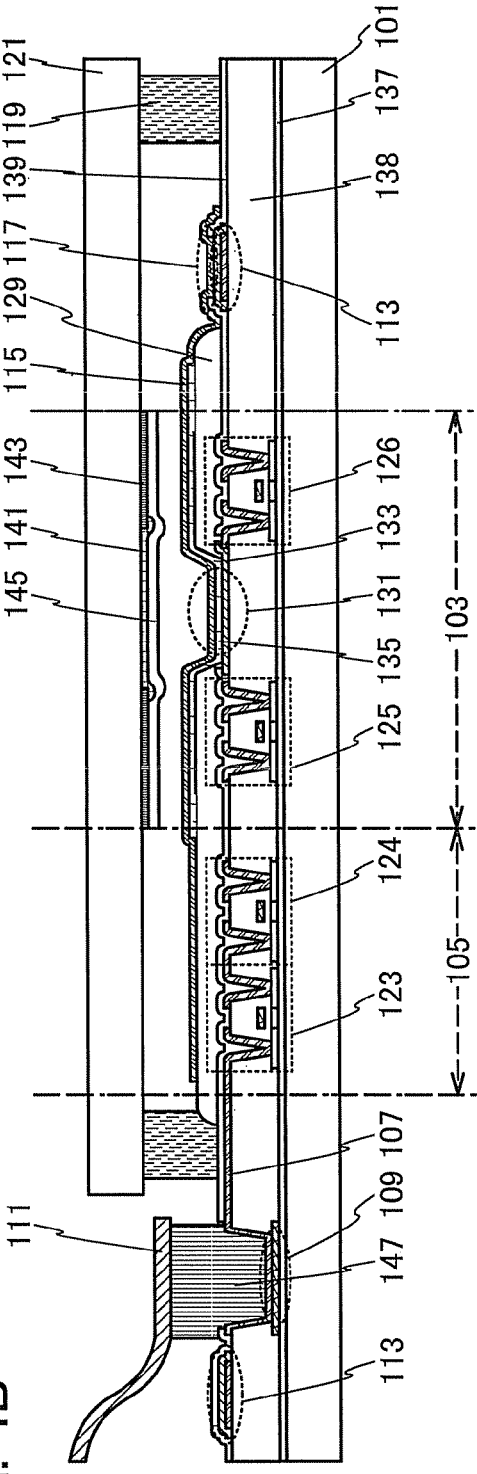

FIG. 4B is a schematic cross-sectional view of a display device where the common wiring 113 is formed using a conductive layer formed from the same second conductive film as the source electrode and/or the drain electrode of each transistor and a conductive layer formed from the same third conductive film as the pixel electrode 133 of the light-emitting element 131 are stacked.

In the sealed region, the conductive layer formed from the second conductive film and the conductive layer formed from the third conductive film are stacked to form the common wiring 113. Furthermore, the common electrode 115 and the common wiring 113 (specifically the conductive layer formed from the third conductive film included in the common wiring 113) are electrically connected to each other through the opening 117 formed in the insulating layer 139 over the common wiring 113. Outside the sealed region, the insulating layer 139 is formed over the common wiring 113 so that the common wiring 113 is not exposed.

It is further preferable to form the common wiring 113 using a conductive layer in which two or more conductive layers are stacked as illustrated in FIGS. 4A and 4B, because the conductivity of the common wiring 113 is increased.

Note that the structure of the common wiring 113 is not limited to the above, and the common wiring 113 can be formed with a single layer or a stack using the same conductive film as the conductive layer included in the transistors or the light-emitting element in the display device 100. Alternatively, a stack of three or more conductive layers can be used. In the case of using a stack of conductive layers, an opening may be formed in an insulating layer provided between conductive layers and the conductive layers may be electrically connected to each other through the opening. When the display device 100 has a multilevel interconnection of at least two layers, the common wiring 113 may be formed with a single layer or a stack of conductive layers using the same conductive film as any of the wirings.

This embodiment can be combined with any of the other embodiments disclosed in this specification as appropriate.

(Embodiment 2)

In this embodiment, display devices according to one embodiment of the present invention, to which a liquid crystal element is applied, will be described with reference to FIGS. 5A and 5B. Note that the description that overlaps with the content in Embodiment 1 is sometimes omitted or simplified in this embodiment.

FIG. 5A is a schematic cross-sectional view of a display device 170 including a liquid crystal element in which an electric field is generated horizontally with respect to a substrate surface. The display device 170 in FIG. 5A differs from the display devices in Embodiment 1 mainly in that pixels in the display portion 103 each include one transistor and that a liquid crystal element is used as a display element.

In the display portion 103, one pixel includes at least one switching transistor 127. An electrode (a source electrode or a drain electrode) of the transistor 127 is electrically connected to a comb-shaped pixel electrode 173 provided over the insulating layer 129. A comb-shaped common electrode 115 is provided on the same plane as the pixel electrode 173.

In this embodiment, the pixel electrode 173 and the common electrode 115 are placed on the same plane; alternatively, these electrodes may be provided on different planes with an insulating layer placed therebetween. In that case, a region where one electrode and the other electrode provided thereover do not overlap with each other is provided.

In a sealed region, a liquid crystal 175 is sealed at least between the second substrate 121 and the pixel electrode 173 and between the second substrate 121 and the common electrode 115. Here, a liquid crystal element 171 is composed of the pixel electrode 173, the common electrode 115, and the liquid crystal 175.

The display device 170 displays an image in the following way: an electric field is generated in the horizontal direction by application of voltage between the pixel electrode 173 and the common electrode 115, alignment of the liquid crystal 175 is controlled by the electric field, and polarization of light from a backlight provided outside the display device 170 is controlled in each pixel.

An alignment film that controls alignment of the liquid crystal 175 may be provided on a surface in contact with the liquid crystal 175. A light-transmitting material is used for the alignment film. A polarizer may be provided on any of surfaces of the first substrate 101 and the second substrate 121. Moreover, a light guide plate may be used so that light from the backlight enters through a side surface of the display device 170.

The color filter 141 is formed on a surface of the second substrate 121 which faces the liquid crystal element 171. By using the color filter 141, a full-color image can be displayed with a backlight that emits white light. With the use of a plurality of light-emitting diodes (LEDs) as a backlight, a time-division display method (a field-sequential driving method) can be employed. In the case of employing a time-division display method, the aperture ratio or the number of pixels per unit area can be increased because neither color filters nor subpixels from which light of red (R), green (G), or blue (B), for example, is obtained are needed.

As the liquid crystal 175, a thermotropic liquid crystal, a low molecular weight liquid crystal, a polymer liquid crystal, a ferroelectric liquid crystal, an anti-ferroelectric liquid crystal, or the like can be used. Moreover, a liquid crystal exhibiting a blue phase is preferably used because an alignment film is not necessary and the viewing angle is wide.

In the sealed region, the common electrode 115 is electrically connected to a connection wiring formed from the same second conductive film as the source electrode and/or the drain electrode of each transistor, through an opening provided in the insulating layers 129 and 139. The connection wiring is electrically connected to the common wiring 113 formed from the same first conductive film as the gate electrode of each transistor, through an opening 117 provided in the insulating layer 138. Outside the sealed region, the insulating layers 138 and 139 are formed over the common wiring 113 so that the common wiring 113 is not exposed. The common wiring 113 is positioned outwardly with respect to the external input terminal 109 so as not to overlap with the signal line 107.

Note that the common wiring 113 is formed from the same first conductive film as the gate electrode of each transistor in FIG. 5A; alternatively, the common wiring 113 may be formed from the same conductive film as another conductive layer included in the transistor or a conductive layer forming the pixel electrode as exemplified in Embodiment 1 or may be a stack of two or more conductive layers.

FIG. 5B is a schematic cross-sectional view of a display device 180 including a liquid crystal element in which an electric field is generated vertically with respect to a substrate surface. The display device 180 differs from the display device 170 mainly in that a pixel electrode 183 is provided to face the common electrode 115.

In the display portion 103, the pixel electrode 183 provided over the insulating layer 129 is electrically connected to the electrode of the switching transistor 127. The common electrode 115 is provided over the second substrate 121 to face the pixel electrode 183.

In a sealed region, the liquid crystal 175 is sealed at least between the pixel electrode 183 and the common electrode 115. Here, a liquid crystal element 181 is composed of the pixel electrode 183, the common electrode 115, and the liquid crystal 175. A spacer for adjusting a gap between the first substrate 101 and the second substrate 121 may be sealed in a region where the liquid crystal 175 is sealed.

The display device 180 displays an image in the following way: an electric field is generated in the vertical direction by application of voltage between the pixel electrode 183 and the common electrode 115, alignment of the liquid crystal 175 is controlled by the electric field, and polarization of light from a backlight provided outside the display device 180 is controlled in each pixel.

In the sealed region, the common electrode 115 is electrically connected, through a connector 185; to a connection wiring formed from the same second conductive film as the source electrode and/or the drain electrode of each transistor. The connection wiring is electrically connected to the common wiring 113 formed from the same first conductive film as the gate electrode of each transistor, through an opening 117 provided in the insulating layer 138. Outside the sealed region, the insulating layers 138 and 139 are formed over the common wiring 113 so that the common wiring 113 is not exposed. The common wiring 113 is positioned outwardly with respect to the external input terminal 109 so as not to overlap with the signal line 107.

The connector 185 can be formed using, for example, a resin material into which resin material beads coated with a conductive film are mixed. The resin material functions as an anisotropic conductor, with which the common electrode 115 and the connection wiring can be electrically connected to each other. For the conductive film that coats the beads, a metal is preferably used, and in particular a metal material that is chemically stable and has low resistance, such as gold (Au), is preferably used. This is because the reliability is increased and the resistivity and contact resistance can be reduced.

Note that the common wiring 113 is formed from the same first conductive film as the gate electrode of each transistor in FIG. 5B; alternatively, the common wiring 113 may be formed using the conductive layer formed from the same conductive film as another conductive layer as exemplified in Embodiment 1 or may be a stack of two or more conductive layers.

As described above, in the display device including the liquid crystal element according to one embodiment of the present invention, the common wiring 113 is positioned to surround the signal lines 107 and the external input terminal 109 so as not to overlap with the signal lines 107 to which signals are input from the FPC 111. As a result, parasitic capacitance is not generated between the signal lines 107 and the common wiring 113, so that delay and waveform distortion of signals input to the driver circuit unit 105 can be suppressed; thus, the display device can operate at high speed. Further, since no parasitic capacitance is generated, the influence of charging and discharging of parasitic capacitance is prevented, which results in suppression of the increase in power consumed to drive the display device.

In addition, the common wiring 113 can be formed from the same conductive film as the wiring or the electrode included in the display device; consequently, the common wiring 113 can be formed without an additional step.

This embodiment can be combined with any of the other embodiments disclosed in this specification as appropriate.

(Embodiment 3)

In this embodiment, EL layers that can be applied to the display device according to one embodiment of the present invention will be described with reference to FIGS. 6A to 6C.

Figure 6A:
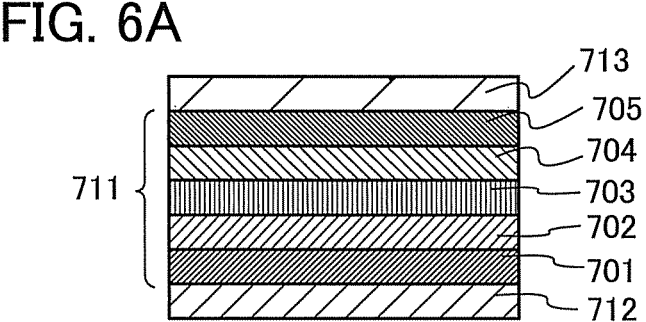
FIGS. 6A to 6C each illustrate an EL layer according to one embodiment of the present invention.

An EL layer 711 illustrated in FIG. 6A is provided between a first electrode 712 and a second electrode 713. The first electrode 712 and the second electrode 713 can have a structure similar to that of the common electrode or the pixel electrode in the above embodiment.

A light-emitting element including the EL layer 711 exemplified in this embodiment can be used in any of the display devices in the above embodiment.

The EL layer 711 includes at least a light-emitting layer containing a light-emitting organic compound. In addition, the EL layer 711 can have a layered structure in which a layer containing a substance with a high electron-transport property, a layer containing a substance with a high hole-transport property, a layer containing a substance with a high electron-injection property, a layer containing a substance with a high hole-injection property, a layer containing a bipolar substance (a substance having a high electron-transport property and a high hole-transport property), and the like are combined as appropriate. In this embodiment, in the EL layer 711, a hole-injection layer 701, a hole-transport layer 702, a layer 703 containing a light-emitting organic compound, an electron-transport layer 704, and an electron-injection layer 705 are stacked in this order from the first electrode 712 side. Note that the stacking order may be inversed.

A method for fabricating the EL layer 711 illustrated in FIG. 6A will be described.

The hole-injection layer 701 is a layer containing a substance with a high hole-injection property. Examples of the substance with a high hole-injection property are metal oxides such as molybdenum oxide, titanium oxide, vanadium oxide, rhenium oxide, ruthenium oxide, chromium oxide, zirconium oxide, hafnium oxide, tantalum oxide, silver oxide, tungsten oxide, and manganese oxide; and phthalocyanine-based compounds such as phthalocyanine ($H_2Pc$) and copper(II) phthalocyanine (CuPc).

Alternatively, aromatic amine compounds which are low molecular organic compounds can be used, for example.

Further alternatively, any of high molecular compounds (e.g., oligomers, dendrimers, or polymers) can be used. A high molecular compound to which acid is added can also be used.

In particular, for the hole-injection layer 701, it is preferable to use a composite material in which an acceptor substance is added to an organic compound having a high hole-transport property. With the use of the composite material in which an acceptor substance is added to a substance with a high hole-transport property, hole injection from the first electrode 712 is facilitated, which leads to a reduction in the drive voltage of a light-emitting element. Such a composite material can be formed, by co-evaporation of a substance with a high hole-transport property and an acceptor substance (electron acceptor). The hole-injection layer 701 is formed using the composite material, whereby hole injection from the first electrode 712 to the EL layer 711 is facilitated.

As the organic compound used for the composite material, various kinds of compounds such as aromatic amine compounds, carbazole derivatives, aromatic hydrocarbon, and high molecular compounds (e.g., oligomers, dendrimers, and polymers) can be used. The organic compound used for the composite material is preferably an organic compound having a high hole-transport property. Specifically, a substance with a hole mobility of $10^{-6}$ cm$^2$/Vs or higher is preferably used. Note that any other substance may also be used as long as its hole-transport property is higher than its electron-transport property.

Examples of the acceptor substance are organic compounds, transition metal oxides, and oxides of metals belonging to Groups 4 to 8 in the periodic table. Specifically, vanadium oxide, niobium oxide, tantalum oxide, chromium oxide, molybdenum oxide, tungsten oxide, manganese oxide, and rhenium oxide are preferable since their electron-accepting properties are high. Among these, molybdenum oxide is particularly preferable since it is stable in the air, has a low hygroscopic property, and is easily treated.

The composite material may be formed using a high molecular compound and the above electron acceptor to be used for the hole-injection layer 701.

The hole-transport layer 702 is a layer containing a substance with a high hole-transport property. Examples of the substance with a high hole-transport property are aromatic amine compounds, most of which have a hole mobility of $10^{-6}$ cm$^2$/Vs or higher. Note that any other substance may also be used as long as its hole-transport property is higher than its electron-transport property. The layer containing a substance with a high hole-transport property is not limited to a single layer and may be a stack of two or more layers containing any of the above substances.

A carbazole derivative, an anthracene derivative, or a high molecular compound having a high hole-transport property may also be used for the hole-transport layer 702.

For the layer 703 containing a light-emitting organic compound, a fluorescent compound which exhibits fluorescence or a phosphorescent compound which exhibits phosphorescence can be used.

Note that the layer 703 containing a light-emitting organic compound may have a structure in which a light-emitting organic compound (guest material) is dispersed in another substance (host material). As a host material, various kinds of materials can be used, and it is preferable to use a substance that has a lowest unoccupied molecular orbital level (LUMO level) higher than that of the light-emitting substance and has a highest occupied molecular orbital level (HOMO level) lower than that of the light-emitting substance.

Alternatively, plural kinds of materials can be used as the host material. For example, a substance that suppresses crystallization may be added in order to suppress crystallization. Moreover, a different kind of substance may be added in order to efficiently transfer energy to the guest material.

With a structure in which a guest material is dispersed in a host material, crystallization of the layer 703 containing a light-emitting organic compound can be suppressed. Further, concentration quenching due to high concentration of the guest material can be suppressed.

For the layer 703 containing a light-emitting organic compound, a high molecular compound can be used.

When a plurality of layers each containing a light-emitting organic compound are provided and the emission colors of the layers are made different, light emission of a desired color can be obtained from the light-emitting element as a whole. For example, in a light-emitting element including two layers each containing a light-emitting organic compound, the emission color of a first layer containing a light-emitting organic compound and the emission color of a second layer containing a light-emitting organic compound are made complementary, so that the light-emitting element as a whole can emit white light. Note that "complementary colors" refer to colors that can produce an achromatic color when mixed. That is, a mixture of light emitted from substances that emit light of complementary colors produces white light. This can be applied to a light-emitting element including three or more layers each containing a light-emitting organic compound.

The electron-transport layer 704 is a layer containing a substance with a high electron-transport property. The substance with a high electron-transport property is mainly one that has an electron mobility of $10^{-6}$ cm$^2$/Vs or higher. The electron-transport layer 704 is not limited to a single layer and may be a stack of two or more layers made of the aforementioned substances.

The electron-injection layer 705 is a layer containing a substance with a high electron-injection property. For the electron-injection layer 705, an alkali metal, an alkaline earth metal, or a compound thereof (e.g., lithium, cesium, calcium, lithium fluoride, cesium fluoride, calcium fluoride, or lithium oxide) can be used. A rare earth metal compound such as erbium fluoride can also be used. Any of the above substances for forming the electron-transport layer 704 can also be used.

Note that the hole-injection layer 701, the hole-transport layer 702, the layer 703 containing a light-emitting organic compound, the electron-transport layer 704, and the electron-injection layer 705 which are described above can each be formed by an evaporation method (e.g., a vacuum evaporation method), an ink-jet method, a coating method, or the like.

Figure 6B:
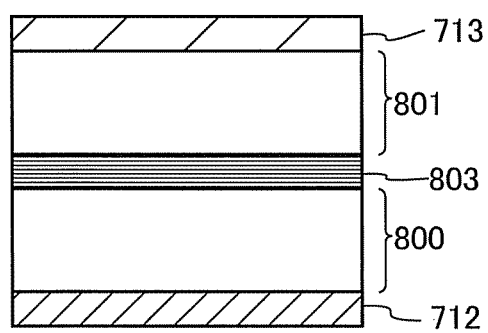

As illustrated in FIG. 6B, a plurality of EL layers may be stacked between the first electrode 712 and the second electrode 713. In that case, a charge generation layer 803 is preferably provided between a first EL layer 800 and a second EL layer 801 which are stacked. The charge generation layer 803 can be formed by using the above-mentioned composite material. Alternatively, the charge generation layer 803 may have a layered structure of a layer containing the composite material and a layer containing another material. In that case, as the layer including another material, a layer including a substance with an electron-donating property (donor substance) and a substance with a high electron-transport property, a layer formed using a transparent conductive film, or the like can be used. A light-emitting element having such a structure is unlikely to suffer the problem of energy transfer, quenching, or the like and gives wider choice of materials, thereby easily having both high light emission efficiency and a long lifetime. Moreover, it is easy to obtain phosphorescence from one EL layer and fluorescence from the other EL layer. This structure can be combined with the above-mentioned structure of the EL layer.

When the emission colors of EL layers are made different, a light-emitting element as a whole can provide light emission of a desired color. For example, when a light-emitting element including two EL layers is formed so that the emission color of the first EL layer and the emission color of the second EL layer are complementary colors, the light-emitting element as a whole can emit white light. Note that "complementary colors" refer to colors that can produce an achromatic color when mixed. That is, a mixture of light emitted from substances that emit light of complementary colors produces white light. This can be applied to a light-emitting element including three or more EL layers.

In order to obtain white light with high color rendering properties, the emission spectrum needs to cover the whole visible light range and thus a light-emitting element in which three or more EL layers are stacked is preferably used. For example, such a light-emitting element can be formed by stacking EL layers emitting light of the respective colors of red, blue, and green. In this manner, the color rendering properties of a light-emitting element can be improved by stacking EL layers of different three or more colors.

An optical adjustment layer may be formed between the first electrode 712 and the second electrode 713. The optical adjustment layer adjusts the optical distance between a reflective electrode and a light-transmitting electrode. With the optical adjustment layer, light with wavelengths in a specific range can be enhanced and as a result, the color tone can be adjusted.

Figure 6C:
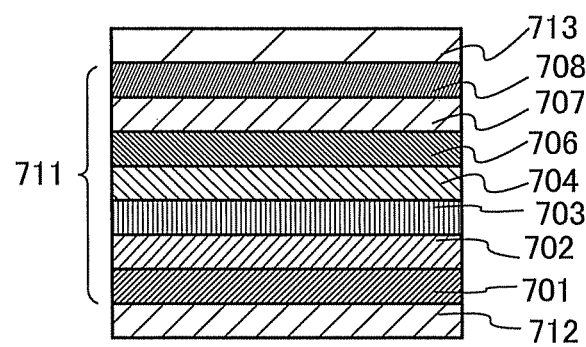

As illustrated in FIG. 6C, the EL layer 711 may include the hole-injection layer 701, the hole-transport layer 702, the layer 703 containing a light-emitting organic compound, the electron-transport layer 704, an electron-injection buffer layer 706, an electron-relay layer 707, and a composite material layer 708 that is in contact with the second electrode 713, between the first electrode 712 and the second electrode 713.

The composite material layer 708 which is in contact with the second electrode 713 is preferably provided, in which case damage caused to the EL layer 711 particularly when the second electrode 713 is formed by sputtering can be reduced. The composite material layer 708 can be formed using the above-described composite material in which an acceptor substance is mixed with an organic compound with a high hole-transport property.

Further, by providing the electron-injection buffer layer 706, an injection barrier between the composite material layer 708 and the electron-transport layer 704 can be reduced; thus, electrons generated in the composite material layer 708 can be easily injected to the electron-transport layer 704.

The electron-injection buffer layer 706 can be formed using a substance with a high electron-injection property, for example, an alkali metal, an alkaline earth metal, a rare earth metal, or a compound of the above metal (e.g., an alkali metal compound (e.g., oxide such as lithium oxide, halide, or carbonate such as lithium carbonate or cesium carbonate), an alkaline earth metal compound (e.g., oxide, halide, or carbonate), or a rare earth metal compound (e.g., oxide, halide, or carbonate)).

When the electron-injection buffer layer 706 contains a substance with a high electron-transport property and a donor substance, the donor substance is preferably added so that the mass ratio of the donor substance to the substance with a high electron-transport property is from 0.001:1 to 0.1:1. As the donor substance, any of the following can be used, for example: an organic compound such as tetrathianaphthacene (TTN), nickelocene, and decamethylnickelocene, in addition to an alkali metal, an alkaline earth metal, a rare earth metal, and a compound of the above metal (e.g., an alkali metal compound (e.g., oxide such as lithium oxide, halide, and carbonate such as lithium carbonate and cesium carbonate), an alkaline earth metal compound (e.g., oxide, halide, and carbonate), and a rare earth metal compound (e.g., oxide, halide, and carbonate)). Note that as the substance with a high electron-transport property, a material similar to the material for the electron-transport layer 704 described above can be used.

Furthermore, the electron-relay layer 707 is preferably formed between the electron-injection buffer layer 706 and the composite material layer 708. The electron-relay layer 707 is not necessarily provided; by providing the electron-relay layer 707 with a high electron-transport property, electrons can be rapidly transported to the electron-injection buffer layer 706.

In the structure in which the electron-relay layer 707 is sandwiched between the composite material layer 708 and the electron-injection buffer layer 706, the acceptor substance contained in the composite material layer 708 and the donor substance contained in the electron-injection buffer layer 706 are less likely to interact with each other, and thus their functions hardly interfere with each other. Accordingly, the increase in the drive voltage can be prevented.

The electron-relay layer 707 contains a substance with a high electron-transport property and is formed so that the LUMO level of the substance with a high electron-transport property is located between the LUMO level of the acceptor substance contained in the composite material layer 708 and the LUMO level of the substance with a high electron-transport property contained in the electron-transport layer 704. In the case where the electron-relay layer 707 contains a donor substance, the donor level of the donor substance is controlled to be located between the LUMO level of the acceptor substance in the composite material layer 708 and the LUMO level of the substance with a high electron-transport property contained in the electron-transport layer 704. As a specific value of the energy level, the LUMO level of the substance with a high electron-transport property contained in the electron-relay layer 707 is preferably −5.0 eV or more, further preferably from −5.0 eV to −3.0 eV.

As the substance with a high electron-transport property contained in the electron-relay layer 707, a phthalocyanine-based material or a metal complex having a metal-oxygen bond and an aromatic ligand is preferably used.

As the metal complex having a metal-oxygen bond and an aromatic ligand, which is contained in the electron-relay layer 707, a metal complex having a metal-oxygen double bond is preferably used. Since the metal-oxygen double bond has an acceptor property (a property of easily accepting electrons), electrons can be transferred (donated and accepted) more easily. Further, the metal complex having a metal-oxygen double bond is considered stable. Thus, the use of the metal complex having the metal-oxygen double bond makes it possible to drive the light-emitting element more stably at low voltage.

As a metal complex having a metal-oxygen bond and an aromatic ligand, a phthalocyanine-based material is preferable. A substance in which a metal-oxygen double bond is more likely to act on another molecular in terms of a molecular structure is particularly preferable because it has a high acceptor property.

Note that the phthalocyanine-based material preferably has a phenoxy group. Specifically, a phthalocyanine derivative having a phenoxy group, such as PhO—VOPc, is preferable. Since a phthalocyanine derivative having a phenoxy group is soluble in a solvent, it has an advantage of being easily handled during formation of the light-emitting element and an advantage of facilitating maintenance of an apparatus used for forming a film.

The electron-relay layer 707 may further contain a donor substance. Examples of the donor substance are an organic compound such as tetrathianaphthacene (TTN), nickelocene, and decamethylnickelocene, in addition to an alkali metal, an alkaline earth metal, a rare earth metal, and a compound of the above metal (e.g., an alkali metal compound (e.g., oxide such as lithium oxide, halide, and carbonate such as lithium carbonate and cesium carbonate), an alkaline earth metal compound (e.g., oxide, halide, and carbonate), and a rare earth metal compound (e.g., oxide, halide, and carbonate)). When such a donor substance is contained in the electron-relay layer 707, electrons can be transferred easily and the light-emitting element can be driven at lower voltage.

In the case where a donor substance is contained in the electron-relay layer 707, in addition to the materials described above, a substance having a LUMO level higher than the acceptor level of the acceptor substance contained in the composite material layer 708 can be used as the substance with a high electron-transport property. Specifically, the LUMO level of the substance is preferably −5.0 eV or more, further preferably from −5.0 eV to −3.0 eV. Examples of such a substance are a perylene derivative and a nitrogen-containing condensed aromatic compound. Note that a nitrogen-containing condensed aromatic compound is preferably used for the electron-relay layer 707 because of its stability.

Note that in the case where a donor substance is contained in the electron-relay layer 707, the electron-relay layer 707 can be formed by a method such as co-evaporation of the substance with a high electron-transport property and the donor substance.

The hole-injection layer 701, the hole-transport layer 702, the layer 703 containing a light-emitting organic compound, and the electron-transport layer 704 can each be formed using any of the above-described materials.

In the above manner, the EL layer 711 in this embodiment can be formed.

This embodiment can be combined with any of the other embodiments disclosed in this specification as appropriate.

(Embodiment 4)

In this embodiment, a liquid crystal element that can be applied to the display device according to one embodiment of the present invention will be described with reference to FIG. 7.

Figure 7:
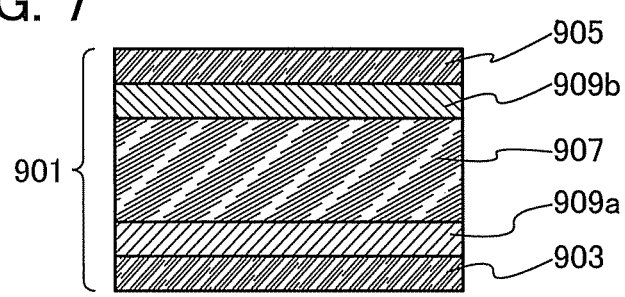
FIG. 7 illustrates a liquid crystal element according to one embodiment of the present invention.

In a liquid crystal element 901 illustrated in FIG. 7, a liquid crystal 907 is sandwiched between a first electrode 903 and a second electrode 905. An alignment film 909a and an alignment film 909b are provided in contact with the liquid crystal 907 on the first electrode 903 side and the second electrode 905 side, respectively.

For the first electrode 903 and the second electrode 905, a light-transmitting conductive material can be used. Examples of the light-transmitting conductive material are indium oxide containing tungsten oxide, indium zinc oxide containing tungsten oxide, indium oxide containing titanium oxide, indium tin oxide containing titanium oxide, indium tin oxide, indium zinc oxide, and indium tin oxide to which silicon oxide is added. Alternatively, a conductive composition containing a conductive macromolecule (also referred to as a conductive polymer) can be used.

In order to fabricate a liquid crystal element for a transmissive liquid crystal display device, a light-transmitting conductive material is used for the first electrode 903 and the second electrode 905 as described above; whereas in order to fabricate a liquid crystal element for a reflective liquid crystal display device, a reflective conductive material is used for the electrode on the side opposite to a viewer. For example, a metal such as titanium, molybdenum, aluminum, copper, tungsten, or tantalum; an alloy including any of the metals; or a stack including any of the metals and alloys can be used.

The alignment films 909a and 909b are provided to control the alignment of the liquid crystal 907. The alignment films 909a and 909b can be formed using an organic resin such as polyimide or polyvinyl alcohol or an inorganic material such as silicon oxide. After the formation of the alignment films 909a and 909b, rubbing treatment is performed on the alignment films 909a and 909b so that liquid crystal molecules to be provided later are aligned at a certain pretilt angle. Note that when the alignment films 909a and 909b are formed using an inorganic material such as silicon oxide, the alignment films 909a and 909b having alignment characteristics can be formed by evaporation without rubbing treatment.

As the alignment films 909a and 909b, an alignment film with which the liquid crystal is aligned by ultraviolet light irradiation may be used. For such an alignment film, a photosensitive resin such as poly(vinyl cinnamate) (PVCi) may be used. When such an alignment film is employed, rubbing treatment is unnecessary; thus, electrostatic discharge damage caused by the rubbing treatment can be prevented and defects and damage of a liquid crystal display device can be reduced in the fabrication process.

As the liquid crystal 907, a known liquid crystal material such as a thermotropic liquid crystal, a low molecular weight liquid crystal, a polymer liquid crystal, a ferroelectric liquid crystal, or an anti-ferroelectric liquid crystal can be used.

Alternatively, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 wt. % or more of a chiral agent is mixed is preferably used for the liquid crystal 907 in order to increase the temperature range. The liquid crystal composition that includes a liquid crystal exhibiting a blue phase and a chiral agent has a short response time of 1 ms or less and has optical isotropy, which makes the alignment process unneeded and the viewing angle dependence small.

When a liquid crystal exhibiting a blue phase is used, rubbing treatment on an alignment film is unnecessary; accordingly, electrostatic discharge damage caused by the rubbing treatment can be prevented and defects and damage of the liquid crystal display device can be reduced in the fabrication process. Thus, the productivity of the liquid crystal display device can be increased. In particular, when a liquid crystal display device is fabricated using transistors, electrical characteristics of the transistors might vary significantly and deviate from the design range by the influence of static electricity. Therefore, it is highly effective to use a blue phase liquid crystal material for a liquid crystal display device including transistors.

Next, the operation mode of the liquid crystal element 901 will be described. Here, a twisted nematic (TN) mode is described as an example.

In the TN mode liquid crystal element 901, liquid crystal molecules in the liquid crystal 907 are twisted 90° between the pair of electrodes when no electric field is applied. Thus, when linear polarized light enters the liquid crystal element 901 with no electric field applied, light whose oscillation direction is shifted by 90° is extracted.

When a proper voltage is applied between the pair of electrodes, the liquid crystal molecules in the liquid crystal 907 are aligned in the electric field direction. Accordingly, light entering the liquid crystal element 901 with voltage applied is extracted without a change in the oscillation direction.

Polarizers are provided on the light incident side and the light emission side of the liquid crystal element 901. In the case where these two polarizers are arranged in crossed Nicols (i.e., their polarizing axes are orthogonal to each other), a normally white mode is obtained, that is, light passes through the liquid crystal when no electric field is applied. On the other hand, in the case where the polarizers are arranged in parallel Nicols (i.e., their polarizing axes are parallel to each other), a normally black mode is obtained, that is, light is blocked when no electric field is applied.

The amount of light extracted through the polarizers can be adjusted by adjusting a voltage applied between the pair of electrodes of the liquid crystal element 901.

Although a TN mode liquid crystal element is described in this embodiment, the liquid crystal element can employ another operation mode such as a vertical alignment (VA) mode, a multi-domain vertical alignment (MVA) mode, an in-plane switching (IPS) mode, a continuous pinwheel alignment (CPA) mode, or a patterned vertical alignment (PVA) mode.

This embodiment can be combined with any of the other embodiments disclosed in this specification as appropriate.

(Embodiment 5)

In this embodiment, electronic devices to which the display device according to one embodiment of the present invention can be applied will be described with reference to FIGS. 8A to 8D.

Examples of the electronic devices to which the display device is applied are television sets (also referred to as televisions or television devices), monitors of computers or the like, cameras such as digital cameras and digital video cameras, digital photo frames, mobile phones (also referred to as cell phones or cellular phones), portable game consoles, personal digital assistants, audio reproducing devices, and large-sized game machines such as pachinko machines. Specific examples of these electronic devices are illustrated in FIGS. 8A to 8D.

Figure 8A:
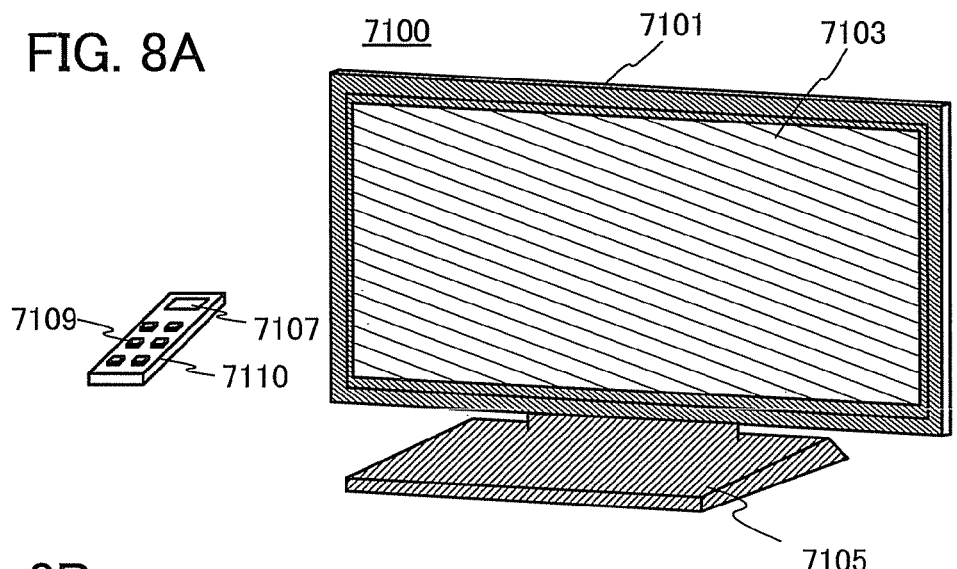
FIGS. 8A to 8D each illustrate an electronic device according to one embodiment of the present invention.

FIG. 8A illustrates an example of a television set. In a television set 7100, a display portion 7103 is incorporated in a housing 7101. Images can be displayed on the display portion 7103, and the display device can be used for the display portion 7103. Here, the housing 7101 is supported by a stand 7105.

The television set 7100 can be operated by an operation switch of the housing 7101 or a separate remote controller 7110. With operation keys 7109 of the remote controller 7110, channels and volume can be controlled and images displayed on the display portion 7103 can be controlled. The remote controller 7110 may have a display portion 7107 for displaying data output from the remote controller 7110.

Note that the television set 7100 is provided with a receiver, a modem, and the like. A general television broadcast can be received with the receiver. When the television set 7100 is connected to a communication network with or without wires via the modem, one-way (from a sender to a receiver) or two-way (between a sender and a receiver or between receivers) information communication can be performed.

Figure 8B:
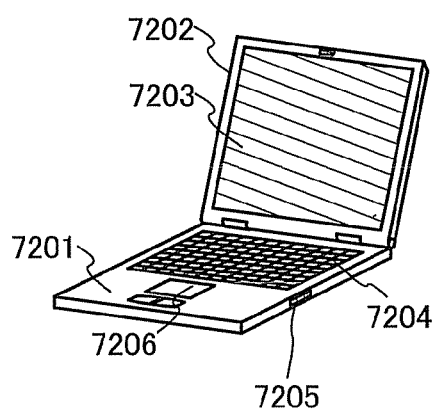

FIG. 8B illustrates a computer that includes a main body 7201, a housing 7202, a display portion 7203, a keyboard 7204, an external connection port 7205, a pointing device 7206, and the like. This computer is fabricated using the display device for the display portion 7203.

Figure 8C:
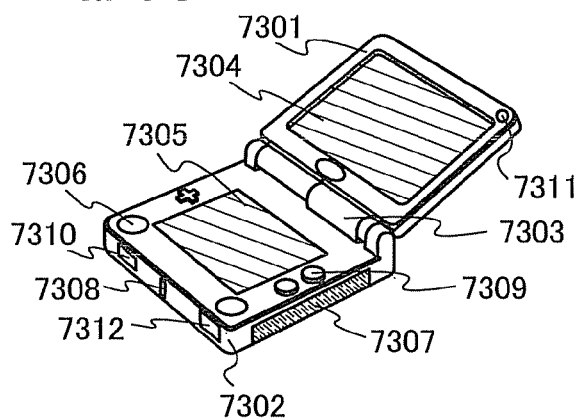

FIG. 8C illustrates a portable game console that includes two housings, a housing 7301 and a housing 7302, which are connected with a joint portion 7303 so that the portable game console can be opened or folded. A display portion 7304 is incorporated in the housing 7301, and a display portion 7305 is incorporated in the housing 7302. The portable game console in FIG. 8C also includes a speaker portion 7306, a recording medium insertion portion 7307, an LED lamp 7308, input means (an operation key 7309, a connection terminal 7310, a sensor 7311 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, tilt angle, vibration, smell, or infrared rays), and a microphone 7312), and the like. Needless to say, without limitation to the above structure, the portable game console can include other accessories as appropriate as long as the display device is used for at least one of the display portions 7304 and 7305. The portable game console in FIG. 8C has a function of reading a program or data stored in a recording medium to display it on the display portion, and a function of sharing information with another portable game console by wireless communication. The portable game console in FIG. 8C can have a variety of functions without limitation to the above functions.

Figure 8D:
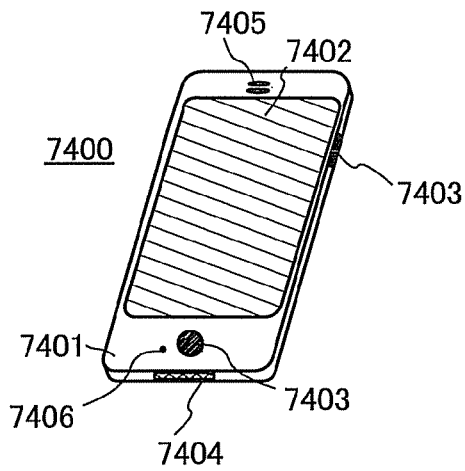

FIG. 8D illustrates an example of a mobile phone. A mobile phone 7400 includes a display portion 7402 incorporated in a housing 7401, an operation button 7403, an external connection port 7404, a speaker 7405, a microphone 7406, and the like. The mobile phone 7400 is fabricated using the display device for the display portion 7402.

When the display portion 7402 of the mobile phone 7400 in FIG. 8D is touched with a finger or the like, data can be input into the mobile phone 7400. Operations such as making a call and creating an e-mail can be performed by touch on the display portion 7402 with a finger or the like.

There are mainly three screen modes of the display portion 7402. The first mode is a display mode mainly for displaying images. The second mode is an input mode mainly for inputting data such as text. The third mode is a display-and-input mode in which two modes of the display mode and the input mode are combined.

For example, in the case of making a call or creating an e-mail, a text input mode mainly for inputting text is selected for the display portion 7402 so that text displayed on the screen can be input. In that case, it is preferable to display a keyboard or number buttons on almost the entire screen of the display portion 7402.

When a detection device including a sensor for detecting inclination, such as a gyroscope or an acceleration sensor, is provided inside the mobile phone 7400, display on the display portion 7402 can be automatically changed by determining the orientation of the mobile phone 7400 (whether the mobile phone is placed horizontally or vertically for a landscape mode or a portrait mode).

The screen modes are switched by touching the display portion 7402 or operating the operation button 7403 of the housing 7401. Moreover, the screen modes can be switched depending on kinds of images displayed on the display portion 7402. For example, when a signal of an image displayed on the display portion is a signal of moving image data, the screen mode is switched to the display mode. When the signal is a signal of text data, the screen mode is switched to the input mode.

In the input mode, when input by touching the display portion 7402 is not performed within a specified period while a signal is detected by an optical sensor in the display portion 7402, the screen mode may be controlled so as to be switched from the input mode to the display mode.

The display portion 7402 can also function as an image sensor. For example, an image of a palm print, a fingerprint, or the like is taken by touch on the display portion 7402 with the palm or the finger, whereby personal authentication can be performed. When a backlight or a sensing light source that emits near-infrared light is provided in the display portion, an image of a finger vein, a palm vein, or the like can be taken.

The display device applied to the above electronic devices is a display device in which parasitic capacitance is not generated between the common wiring and the signal line and which operates at high speed with low power consumption; consequently, the electronic device can operate at high speed with low power consumption.

This embodiment can be combined with any of the other embodiments disclosed in this specification as appropriate.

This application is based on Japanese Patent Applications serial No. 2011-140298 filed with Japan Patent Office on Jun. 24, 2011, the entire contents of which are hereby incorporated by reference.

What is claimed is:

1. A display device comprising:
 a display portion on a substrate, comprising a pixel comprising a display element;
 a driver circuit unit on the substrate;
 an external input terminal on the substrate;
 a signal line on the substrate; and
 a common wiring on the substrate,
 wherein the external input terminal and the display portion are electrically connected to each other through the signal line and the driver circuit unit,
 wherein the common wiring is electrically connected to an electrode of the display element,
 wherein the common wiring is arranged to form a closed curve,
 wherein the display portion and the external input terminal are entirely surrounded by the closed curve in a plan view,
 wherein the external input terminal is provided between the common wiring formed on the substrate and the driver circuit unit,
 wherein the driver circuit unit and the external input terminal do not overlap with each other, and
 wherein the common wiring and the signal line do not overlap with each other.

2. The display device according to claim 1,
 wherein the pixel comprises a transistor and a pixel electrode electrically connected to the transistor, and
 wherein the common wiring and one of a conductive layer of the transistor and a conductive layer of the pixel electrode are formed from a same layer.

3. The display device according to claim 1,
 wherein the common wiring and the signal line are formed from a same layer.

4. The display device according to claim 1,
 wherein the display element is a light-emitting element,
 wherein the electrode of the display element is a common electrode of the light-emitting element, and
 wherein a pixel electrode, a layer including a light-emitting organic compound, and the common electrode of the light-emitting element are stacked.

5. The display device according to claim 1,
 wherein the display element is a liquid crystal element,
 wherein the electrode of the display element is a common electrode of the liquid crystal element, and
 wherein a liquid crystal of the liquid crystal element is sandwiched between a pixel electrode and the common electrode.

6. The display device according to claim 1,
 wherein the pixel comprises a transistor and a pixel electrode electrically connected to the transistor,
 wherein the common wiring comprises a first conductive layer and a second conductive layer,
 wherein the first conductive layer is formed from a same layer as source and drain electrodes of the transistor are formed from,
 wherein the second conductive layer is formed from a same layer as the pixel electrode are formed from, and
 wherein the electrode of the display element is over and in direct contact with the second conductive layer.

7. A display device comprising:
a display portion on a substrate, comprising a pixel;
a driver circuit unit on the substrate;
an external input terminal on the substrate;
a signal line on the substrate; and
a common wiring on the substrate,
wherein the external input terminal and the display portion are electrically connected to each other through the signal line and the driver circuit unit,
wherein a common potential is applied to the display portion through the common wiring,
wherein the common wiring is arranged to form a closed curve,
wherein the display portion and the external input terminal are entirely surrounded by the closed curve in a plan view,
wherein the external input terminal is provided between the common wiring formed on the substrate and the driver circuit unit,
wherein the driver circuit unit and the external input terminal do not overlap with each other, and
wherein the common wiring and the signal line do not overlap with each other.

8. The display device according to claim 7,
wherein the pixel comprises a transistor and a pixel electrode electrically connected to the transistor, and
wherein the common wiring and one of a conductive layer of the transistor and a conductive layer of the pixel electrode are formed from a same layer.

9. The display device according to claim 7,
wherein the common wiring and the signal line are formed from a same layer.

10. The display device according to claim 7,
wherein the pixel comprises a light-emitting element, and
wherein a pixel electrode, a layer including a light-emitting organic compound, and a common electrode of the light-emitting element are stacked.

11. The display device according to claim 7,
wherein the pixel comprises a liquid crystal element, and
wherein a liquid crystal of the liquid crystal element is sandwiched between a pixel electrode and a common electrode.

12. A display device comprising:
a display portion on a substrate, comprising a pixel comprising a display element;
a driver circuit unit on the substrate;
an external input terminal on the substrate;
a signal line on the substrate; and
a common wiring on the substrate,
wherein the external input terminal and the display portion are electrically connected to each other through the signal line and the driver circuit unit,
wherein the common wiring is electrically connected to an electrode of the display element,
wherein the common wiring is arranged to form a closed curve,
wherein the display portion and the external input terminal are entirely surrounded by the closed curve in a plan view,
wherein the external input terminal is provided between the common wiring formed on the substrate and the driver circuit unit, and
wherein the driver circuit unit and the external input terminal do not overlap with each other.

13. The display device according to claim 7,
wherein the pixel comprises a transistor, a pixel electrode electrically connected to the transistor, and a common electrode,
wherein the common wiring comprises a first conductive layer and a second conductive layer,
wherein the first conductive layer is formed from a same layer as source and drain electrodes of the transistor are formed from,
wherein the second conductive layer is formed from a same layer as the pixel electrode are formed from, and
wherein the common electrode is over and in direct contact with the second conductive layer.

14. The display device according to claim 12,
wherein the pixel comprises a transistor and a pixel electrode electrically connected to the transistor, and
wherein the common wiring and one of a conductive layer of the transistor and a conductive layer of the pixel electrode are formed from a same layer.

15. The display device according to claim 12,
wherein the common wiring and the signal line are formed from a same layer.

16. The display device according to claim 12,
wherein the display element is a light-emitting element,
wherein the electrode of the display element is a common electrode of the light-emitting element, and
wherein a pixel electrode, a layer including a light-emitting organic compound, and the common electrode of the light-emitting element are stacked.

17. The display device according to claim 12,
wherein the display element is a liquid crystal element,
wherein the electrode of the display element is a common electrode of the liquid crystal element, and
wherein a liquid crystal of the liquid crystal element is sandwiched between a pixel electrode and the common electrode.

18. The display device according to claim 12,
wherein the pixel comprises a transistor and a pixel electrode electrically connected to the transistor,
wherein the common wiring comprises a first conductive layer and a second conductive layer,
wherein the first conductive layer is formed from a same layer as source and drain electrodes of the transistor are formed from,
wherein the second conductive layer is formed from a same layer as the pixel electrode are formed from, and
wherein the electrode of the display element is over and in direct contact with the second conductive layer.

* * * * *